(12) United States Patent
Cagle et al.

(10) Patent No.: US 8,899,563 B2
(45) Date of Patent: Dec. 2, 2014

(54) FLEXIBLE VOLUMETRIC STRUCTURE

(75) Inventors: Christopher M. Cagle, Yorktown, VA (US); Robin W. Schlecht, Newport News, VA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1139 days.

(21) Appl. No.: 12/482,503

(22) Filed: Jun. 11, 2009

(65) Prior Publication Data
US 2010/0314810 A1 Dec. 16, 2010

(51) Int. Cl.
*F16F 3/00* (2006.01)
*F16F 3/02* (2006.01)

(52) U.S. Cl.
CPC .................................... *F16F 3/02* (2013.01)
USPC .......................................... 267/153; 267/165

(58) Field of Classification Search
USPC .................................. 267/144, 153, 164, 165
See application file for complete search history.

(56) References Cited

U.S. PATENT DOCUMENTS

| | | | |
|---|---|---|---|
| 3,086,899 A * | 4/1963 | Ingraham et al. | 428/158 |
| 4,038,040 A | 7/1977 | Nagl | |
| 4,110,857 A * | 9/1978 | Banister | 428/184 |
| 5,435,619 A * | 7/1995 | Nakae et al. | 296/187.12 |
| 5,747,140 A * | 5/1998 | Heerklotz | 428/131 |
| 5,810,291 A | 9/1998 | Geiger et al. | |
| 5,931,422 A | 8/1999 | Geiger et al. | |
| 5,958,803 A | 9/1999 | Geiger et al. | |
| 5,962,150 A | 10/1999 | Priluck | |
| 6,027,074 A | 2/2000 | Cameron et al. | |
| 6,337,294 B1 | 1/2002 | Waldrop, III | |
| 6,588,709 B1 | 7/2003 | Dunne et al. | |
| 6,679,967 B1 * | 1/2004 | Carroll et al. | 156/222 |
| 7,338,038 B2 * | 3/2008 | Maurer et al. | 267/144 |
| 7,513,344 B2 * | 4/2009 | Toccalino et al. | 188/371 |
| 2002/0106483 A1 * | 8/2002 | Obeshaw | 428/116 |
| 2005/0151015 A1 | 7/2005 | Cagle et al. | |

OTHER PUBLICATIONS

Christopher M. Cagle, et al., "Adaptive composite Technology Skins (ACTS) and Flex Tailorable Volumes (FTV) for Advanced Morphing Aircraft Structures", NASA Publication, pp. 1-14.

* cited by examiner

*Primary Examiner* — Bradley King
(74) *Attorney, Agent, or Firm* — Andrea Z. Warmbier; Helen M. Galus

(57) ABSTRACT

A flexible volumetric structure has a first spring that defines a three-dimensional volume and includes a serpentine structure elongatable and compressible along a length thereof. A second spring is coupled to at least one outboard edge region of the first spring. The second spring is a sheet-like structure capable of elongation along an in-plane dimension thereof. The second spring is oriented such that its in-plane dimension is aligned with the length of the first spring's serpentine structure.

31 Claims, 7 Drawing Sheets

FLEXIBLE VOLUMETRIC STRUCTURE

ORIGIN OF THE INVENTION

The invention was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to flexible surfaces and their support structures. More specifically, the invention is a flexible volumetric structure having a flexible three dimensional support with a flexible skin coupled thereto.

2. Description of the Related Art

Improving aerodynamic performance of land-based vehicles, water-borne vehicles, and aircraft has generally focused on shape and/or configuration of the various vehicle surfaces or "skins" that interface with surrounding fluid environment. With respect to aircraft, "skins" have been developed with changeable mechanical properties. Ideally, these skins are coupled to movable aircraft structures called "morphing" aircraft structures. Such "morphing" can imply large or global shape change such as increasing wing aspect ratio or wing planform area, or changes in wing chamber, twist and/or leading/trailing edge shape. However, morphing also implies smaller shape changes such as surface bump growth/contraction for shockwave control, drag control, etc. In general, these skins must be coupled to an underlying actuation structure that can change the shape of the skin while maintaining (at least for most applications) a smooth shape. However, there are currently no large-surface-area actuators capable of maintaining a skin's smooth shape throughout its desired range of motion. Accordingly, the use of morphable skins have been essentially relegated to vehicle areas that exhibit small or local shape changes, e.g., gap sealing, hinge lines, control surface junctions, etc.

SUMMARY OF THE INVENTION

Accordingly, it is an object of the present invention to provide flexible volumetric structures.

Another object of the present invention is to provide flexible structure having a flexible support structure with a flexible conformable surface coupled thereto.

Other objects and advantages of the present invention will become more obvious hereinafter in the specification and drawings.

In accordance with at least one embodiment of the present invention, a flexible volumetric structure has a first spring and a second spring. The first spring defines a three-dimensional volume and includes a serpentine structure elongatable along a length thereof. The first spring also defines opposing outboard edge regions spanning the length thereof. The second spring is coupled to at least one of the outboard edge regions. The second spring is a sheet-like structure capable of elongation and compression along an in-plane dimension thereof. The second spring is oriented such that its in-plane dimension is aligned with the length of the first spring's serpentine structure.

DETAILED DESCRIPTION OF THE INVENTION

Figure 1A:
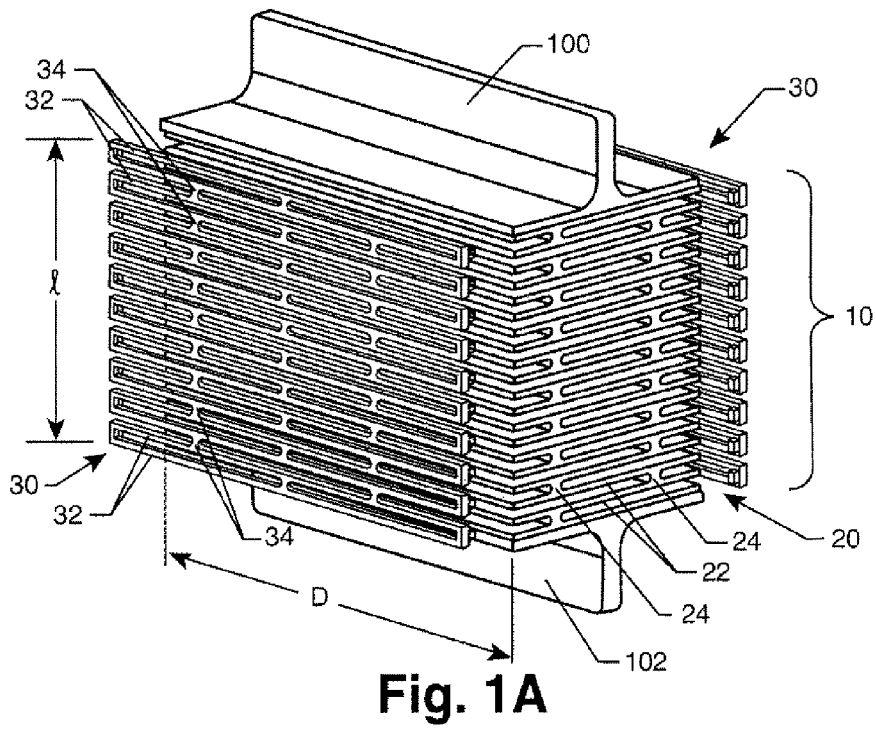
FIG. 1A is an exploded perspective view of a flexible volumetric structure in accordance with an embodiment of the present invention.

Referring now to the drawings, simultaneous reference will be made to FIGS. 1A-3 where a flexible volumetric structure in accordance with the present invention is illustrated and is referenced generally by numeral 10. Structure 10 will be used to explain the essential features of the present invention. However, it is to be understood that the rectangular shape of structure 10 is purely exemplary. That is, the novelty of the present invention can be applied to a wide variety of geometries as would be understood by one of ordinary skill in the art based on the following description. Furthermore, the present invention will have utility for a wide variety of applications to include, but not limited to, morphing aircraft structures, control and/or surface geometries for land-based and water borne vehicles, impact-resistant structures that provide "self-healing" features (e.g., automobile bumpers), and any structures that, when loaded, must flex or otherwise conform to a geometry that is different than the structure's unloaded state.

For purpose of illustration, structure 10 is captured and/or coupled to opposing mounts 100 and 102. It is to be understood that mounts 100 and 102 are not elements of structure 10 and, therefore, do not impose limitations on structure 10. One or both of mounts 100 and 102 can serve as points of actuation that introduce or apply flexing forces to structure 10. For example, one of mounts 100 and 102 could be a fixed structure while the other mount is coupled to a moving actuator. In another possible scenario, each of mounts 100 and 102 could be coupled to an independent moving actuator.

Flexible volumetric structure 10 is defined by two spring structures 20 and 30. Spring structure 20 is the central or core support for spring structure 30, two of which are used in the illustrated embodiment. Core spring structure 20 defines a three-dimensional or spatial volume that can be sized/shaped to fit the needs of a particular application as will be evident in the additional exemplary embodiments discussed further herein below. Regardless of its size/shape, the core element defined by spring structure 20 advantageously includes at least one serpentine portion capable of elongation and compression along a dimension thereof. In the illustrated embodiment, the serpentine portion is defined by beams 22 maintained in spaced-apart relation by beam connectors 24. More specifically, as shown, beam connectors 24 can be aligned in two spaced-apart columns with only one connector 24 between two adjacent beams 22. In this embodiment, the two columns of connectors 24 are parallel. However, the two columns of connectors 24 could also be non-parallel without departing from the scope of the present invention. Further, the connectors can be arrayed along a curved line without departing from the scope of the present invention.

Along the length "L" of spring structure 20, connectors 24 alternate in terms of column location. In this way, beams 22 and connectors 24 define a serpentine structure along the length of spring structure 20. Although not required, beam 20 in the illustrated embodiment, can have extensions 20A that extend past connectors 24.

Figure 1B:
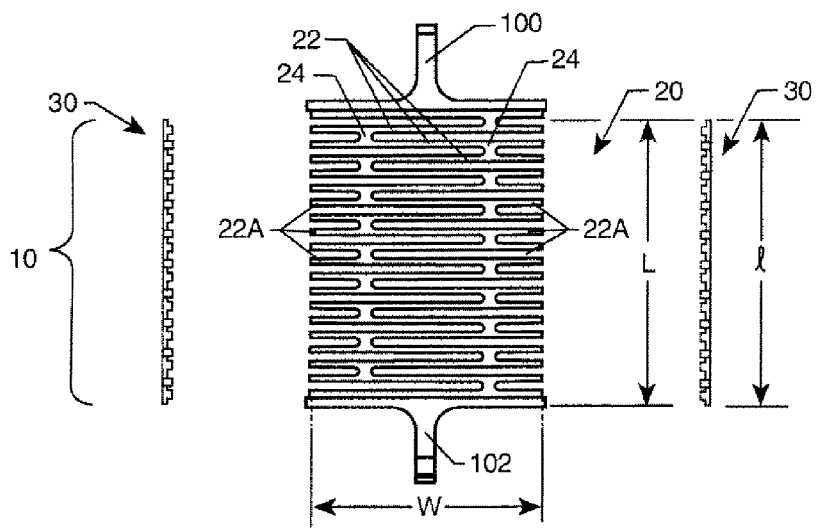
FIG. 1B is an exploded end view of the flexible volumetric structure illustrated in FIG. 1A.

The above-described serpentine structure defined by beams 22 and connectors 24 is best seen in the end view illustrated in FIG. 1B. This structure can be repeated multiple times along the depth "D" of spring structure 20. Each such serpentine structure is spaced-apart from an adjacent serpentine structure, and is coupled thereto by, for example, continuous portions of beams 20 and/or extensions 22A in the depth dimension D of spring structure 20.

The outward ends of beams 22 or, as in the illustrated embodiment, the outboard ends of beam extension 22A, define at least one region (referred to as "outboard end region" hereinafter) that span the length L and depth D of spring structure 20. As will be explained further below, each of these outboard end regions can serve as a mounting location for a spring structure 30.

On its own, spring structure 20 has the properties of a spring in that it can be elongated or compressed along its length L, e.g., by means of forces applied to/by one or both of mounts 100 and 102. This means that the outboard end regions of structure 20 will also elongate or compress under such forces. At the same time, the serpentine structure defined by beams 22/connectors 24 allows the outboard end regions to flex "out-of-plane" as best seen in FIG. 3. In the illustrated embodiment, each of the outboard end regions is planar when core spring structure 20 is in an unloaded state (i.e., as shown in FIGS. 1A-2B). However, as will be explained further below, the outboard end regions defined by the core spring structure need not be planar prior to the core spring structure's transition to a loaded state from an unloaded state.

Core spring structure 20 will generally be a one-piece structure cast, cut or molded into its desired unloaded shape that defines the size and shape of the structure's outboard end regions. Accordingly, spring structure 20 can be made from a variety of metals or plastics without departing from the scope of the present invention.

As mentioned above, the present invention also includes at least one spring structure 30 coupled to an outboard end region (e.g., defined by beam extensions 22A). In general, spring structure 30 is a thin, planar or sheet-like structure that (i) can be coupled to an outboard end region (e.g., defined by the ends of beam extensions 22A in the illustrated embodiment) of core spring structure 20, and (ii) conforms to the elongation, compression, and/or out-of-plane flexing of spring structure 20. In the illustrated embodiment, spring structure 30 is a uniaxial spring that can flex along its length "l" as disclosed in U.S. Patent Publication No. 2005/0151015, the contents of which are hereby incorporated by reference. Spring structure 30 is positioned on spring structure 20 such that the corresponding lengths l and L are in alignment as is most clearly evident in FIG. 1B.

The planar spring structure (or structures) coupled to core spring structure 20 is not limited to the illustrated embodiment. For example, other uniaxial spring designs or bi-axial planar springs (such as those disclosed in U.S. Patent Publication No. 2005/0151015) could also be used without departing from the scope of the present invention. Still further, in cases where two such planar spring structures are coupled to a core spring structure, the two planar spring structures need not be the same.

Figure 2A:
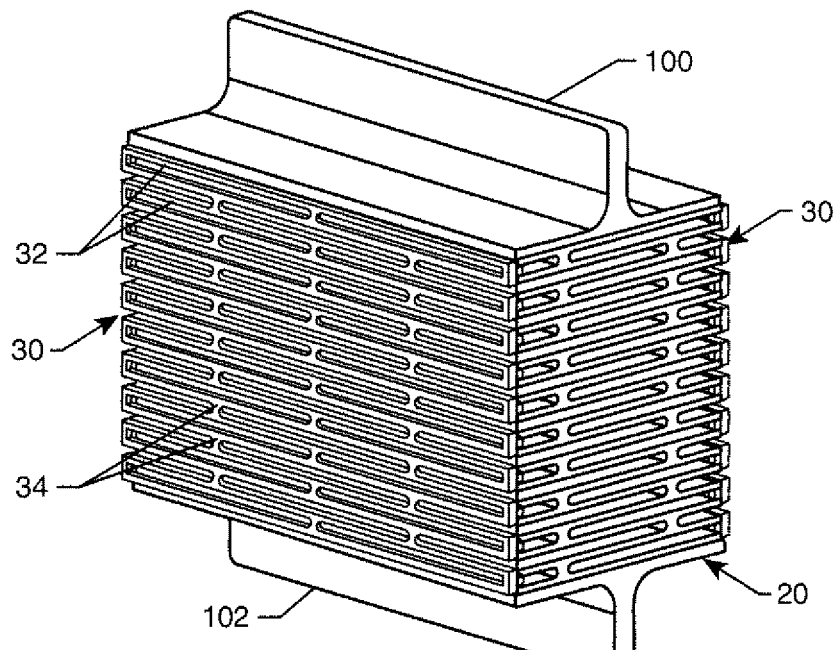
FIG. 2A is a perspective view of the flexible volumetric structure of FIG. 1A with its flexible skins coupled thereto with the structure being in its unloaded state.
Figure 2B:
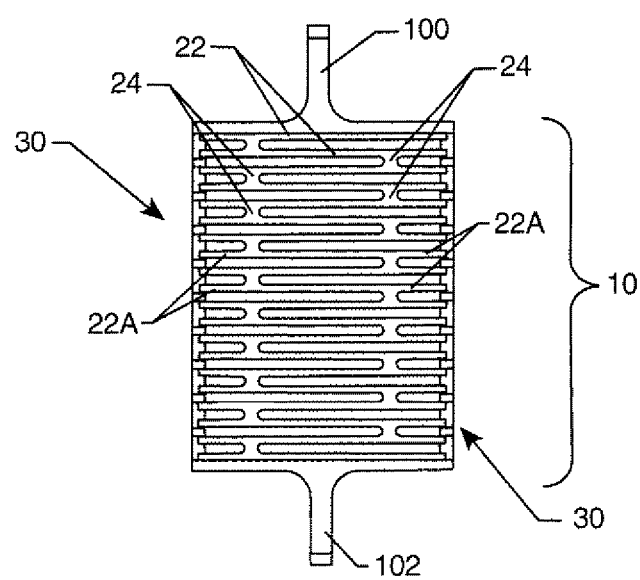
FIG. 2B is an end view of the flexible volumetric structure illustrated in FIG. 2A.
Figure 3:
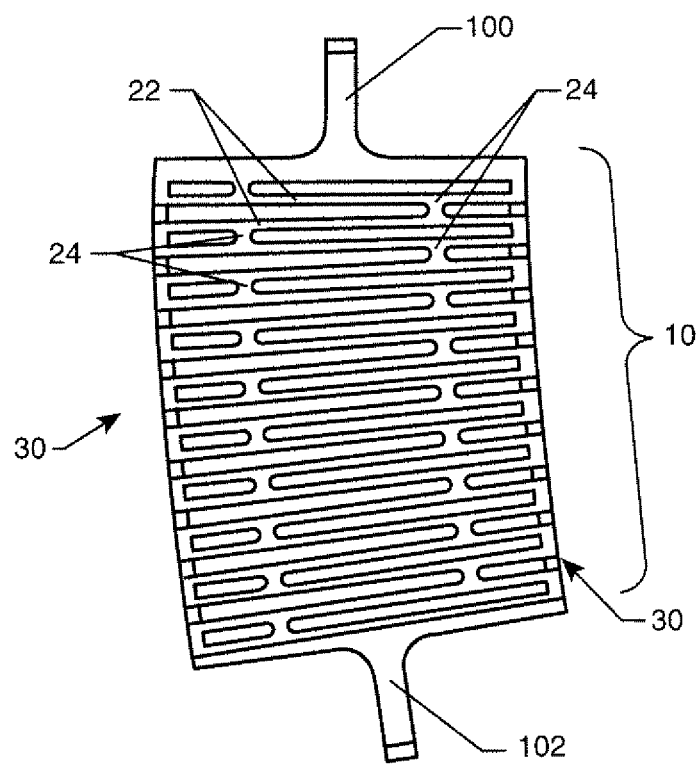
FIG. 3 is an end view of the flexible volumetric structure in a loaded or flexed state.

Planar spring structure 30 is illustrated in FIGS. 1A and 2A in its unloaded or nondeflected state where beams 32 are joined by connectors 34. In their undeflected state, beams 32 can be parallel (as illustrated) or non-parallel. Similarly, connectors 34 can be arrayed in a variety of ways, for example, in parallel straight lines (as illustrated), non-parallel straight lines, or curved lines without departing from the scope of the present invention. The non-deflected configuration of planar spring structure 30 can be designed in conjunction with the strain of the material used to manufacture planar spring structure 30.

Figure 4A:
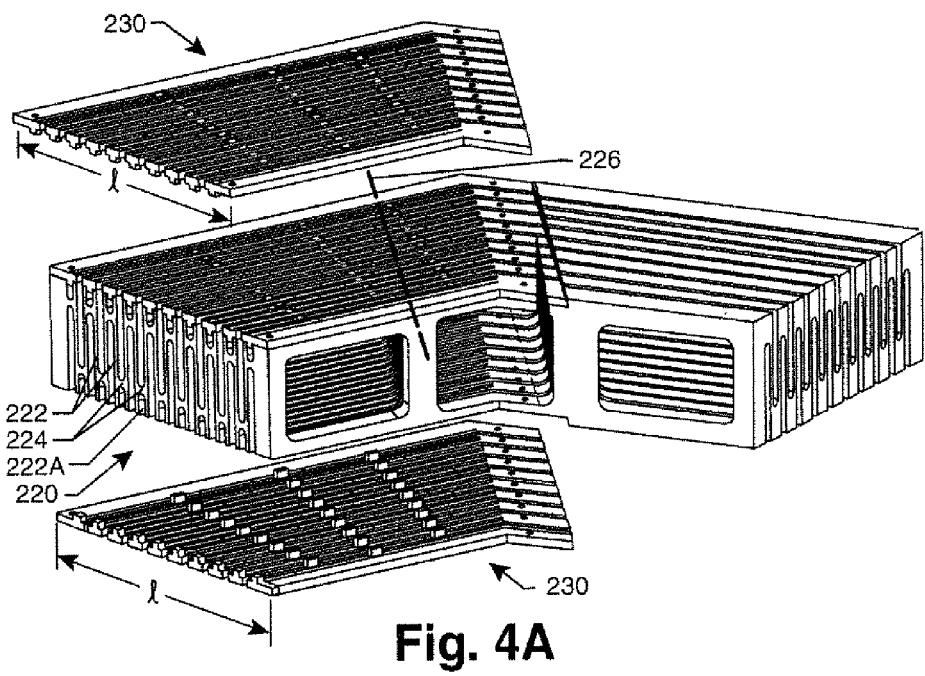
FIG. 4A is an exploded perspective view of a flexible volumetric structure in accordance with another embodiment of the present invention.
Figure 4B:
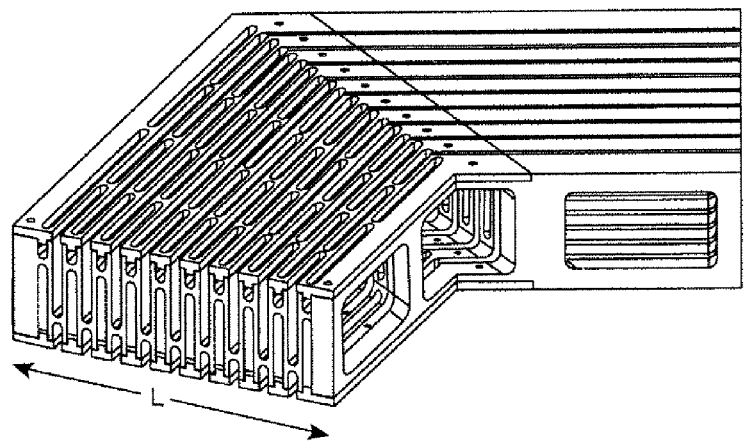
FIG. 4B is a perspective view of the flexible volumetric structure of FIG. 4A with its planar spring structures coupled thereto.

As previously mentioned, the novelty of the present invention can be extended to a variety of shapes and applications. For example, FIGS. 4A and 4B illustrate a flexible volumetric structure 200 having a trapezoid-shaped core spring structure 220 with planar spring structures 230 coupled to outboard end regions of spring structure 220. Similar to the previously-described core spring structure, spring structure 220 has multiple (two in this example) serpentine portions formed by beams 222 and connectors 224. In the drawings, one serpentine portion is visible and the second is aligned with dashed lines 226. To save on material and weight, the central portion of spring structure 220 is hollow between the serpentine portions. A planar spring structure 230 is coupled to the outboard end regions (e.g., defined by the ends of beam extensions 222A). Spring structure 230, which is designed to elongate along its length l, is positioned such that length l and length L (of spring structure 220) are aligned.

Figure 5:
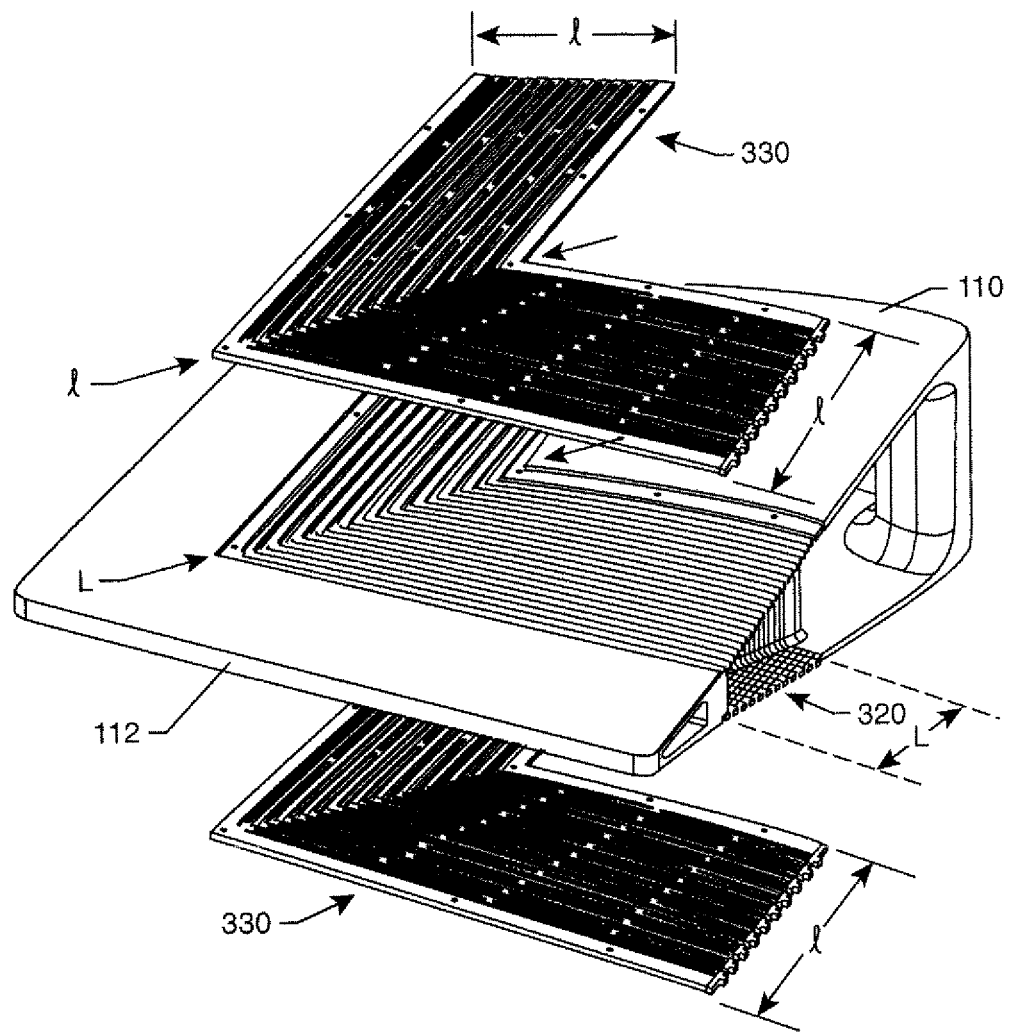
FIG. 5 is an exploded perspective view of a flexible volumetric structure configured for a corner element in accordance with another embodiment of the present invention.

FIG. 5 illustrates yet another embodiment of the present invention in which an L-shaped flexible volumetric structure forms a flexible corner between an inner corner mount 110 and an outer corner mount 112. For clarity of illustration, this embodiment is only shown in an exploded view. In accordance with the present invention, the L-shaped structure includes a core spring structure 320 and two planar spring structures 330. Even though core spring structure 320 defines a wedge-shaped volume along its length L, each of the multiple serpentine sections (not visible in FIG. 5) would be configured as described for the previous embodiments. That is, spring structure 320 can elongate along its length L as well as flex out-of-plane with respect to the outboard end regions thereof that serve as the mounting locations for planar spring structures 330. The lengths L and l maintain their aligned orientations relative to one another as in the previous embodiments. However, note that the absolute orientations of lengths L and l change depending on their location along the L-shape.

Figure 6:
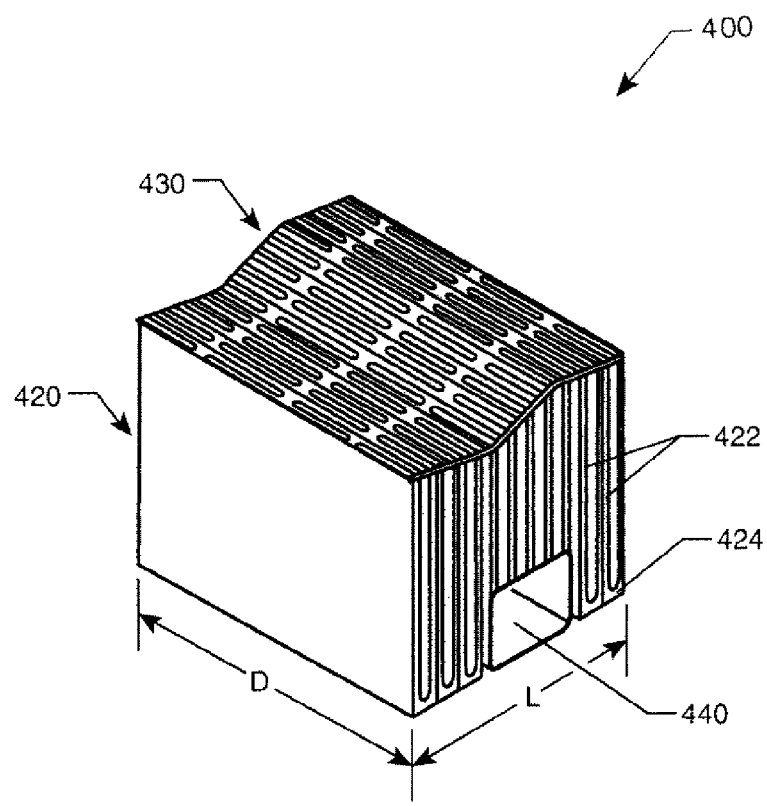
FIG. 6 is a perspective view of a flexible volumetric structure having a face thereof defined by three-dimensional geometry and incorporating a rigid structure in accordance with another embodiment of the present invention.

Another embodiment of the present invention is illustrated in FIG. 6 where a flexible volumetric structure 400 illustrates two additional features that can be incorporated by the present invention. Although both features are included in structure 400, it is to be understood that they are not dependent on one another. Briefly, the two new features presented by structure 400 are its non-loaded three-dimensional surface and the incorporation of a rigid element in the structure's core spring.

These features will be explained in detail below.

Structure 400 has a core spring structure 420 having a serpentine structure defined by beams 422 and connectors 424. In this embodiment, connectors 424 are positioned at the outboard ends of beams 422, i.e., at the outboard end regions, of spring structure 420. As shown, the "top" outboard end region defines a non-loaded three-dimensional shape that elongates/flexes commensurate with elongation of spring structure 420 along its length L. Coupled and conforming to the shaped outboard end region is spring structure 430. For example, spring structure 430 can be configured as a uniaxial spring as described previously herein with its elongatable dimension aligned with length L of spring structure 420. The out-of-plane flexibility of spring structure 430 allows it to conform to the non-loaded and shaped outboard end region of core spring structure 420 as well as the elongated and/or flexed state of spring structure 420.

Flexible volumetric structure 400 further includes a rigid structure 440 that extends partially into or fully through spring structure 420 along its depth D. For example, rigid structure 440 could be a hollow housing defining a housing or conduit for equipment used to actuate spring structure 420 (e.g., motors, actuators, etc.), equipment that must pass through spring structure 420 (e.g., cables, wires, fluids, etc.), etc. Rigid structure 440 can be coupled to spring structure 420 while still allowing elongation thereof along length L.

Figure 7:
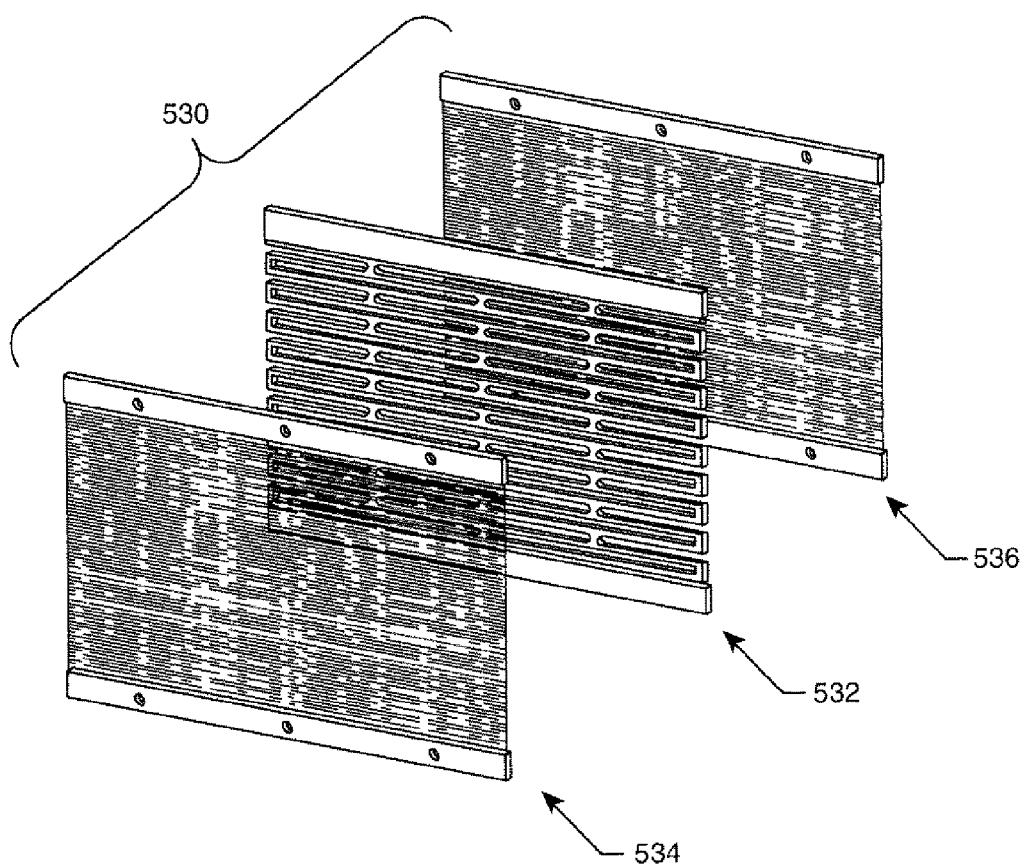
FIG. 7 is an exploded perspective view of multi-layer spring forming the sheet-like spring portion of a flexible skin in accordance with an embodiment of the present invention.

Thus far in the description, the illustrated sheet-like spring structures are configured as a single layer spring. However, the present invention is not so limited. For example, FIG. 7 illustrates a multi-layer, sheet-like spring structure 530 defined by a central spring layer 532 sandwiched by facing spring layers 534 and 536. Each of layers 532-536 can be constructed as a uniaxial (as shown) or biaxial spring with corresponding axes of elongation being aligned in the sandwich configuration. The spring layers can be bonded together, for example, by a flexible elastomer (not shown).

Figure 8:
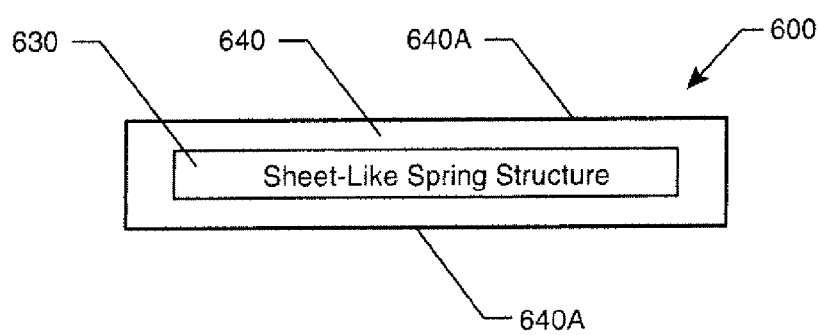
FIG. 8 is a schematic view of a flexible skin formed by encapsulating the sheet-like spring in a flexible material in accordance with an embodiment of the present invention.

To more clearly show the various structural features of the present invention, described embodiments are illustrated without any "skin" covering the outer portions of the flexible volumetric structures. However, in practice, typically some type of smooth and flexible material will be coupled to the structure's sheet-like spring structure. Accordingly, FIG. 8 presents a schematic view of a typical flexible skin 600 that includes a sheet-like spring structure 630 encapsulated within a solid flexible material 640 that can present smooth and flexible surfaces 640A. Spring structure 630 can be any single or multi-layer sheet-like spring structure as described earlier herein. Material 640 is typically a flexible elastomer that can be cast about spring structure 630 in ways well known in the art.

The advantages of the present invention are numerous. The combination of a flexible support structure and flexible skin allows both a support and its surface to "morph" in unison. The flexible volumetric structures described herein can be adapted for a wide variety of shapes, sizes, and applications to include temporarily-actuated and permanently-deformable surfaces, features or volumes. Thus, the present invention will find utility in effecting both small and global shape changes.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A flexible volumetric structure, comprising:
a first spring defining a three-dimensional volume, said first spring including a serpentine structure elongatable and compressible along a length thereof, said first spring defining opposing outboard edge regions spanning said length; and
a second spring coupled to at least one of said outboard edge regions, said second spring comprising a sheet-like structure capable of elongation and compression along an in-plane dimension thereof, said second spring oriented such that said in-plane dimension is aligned with said length of said serpentine structure,
wherein the first spring and the second spring are each configured to return to an unloaded geometry after transitioning from an unloaded state to a loaded state, and
wherein the serpentine structure is defined by a series of beams maintained in a spaced apart relation by a series of beam connectors aligned in two spaced apart columns along said length of said serpentine structure consisting of only one beam connector of the series of beam connectors between any two adjacent beams of the series of beams.

2. The flexible volumetric structure as in claim 1, wherein said first spring comprises one-piece construction.

3. The flexible volumetric structure as in claim 1, wherein said second spring comprises one-piece construction.

4. The flexible volumetric structure as in claim 1, wherein said first spring comprises a material selected from the group consisting of metals and plastics.

5. The flexible volumetric structure as in claim 1, wherein said second spring comprises a material selected from the group consisting of metals and plastics.

6. The flexible volumetric structure as in claim 1, further comprising a rigid structure extending at least partially into said first spring.

7. The flexible volumetric structure as in claim 6, wherein said rigid structure is hollow.

8. The flexible volumetric structure as in claim 1, further comprising a rigid structure extending through said first spring.

9. The flexible volumetric structure as in claim 8, wherein said rigid structure is hollow.

10. The flexible volumetric structure as in claim 1, wherein said at least one of said outboard edge regions is planar when said first spring is in the unloaded state.

11. The flexible volumetric structure as in claim 1, wherein said at least one of said outboard edge regions defines a three-dimensional shape when said first spring is in the unloaded state wherein said second spring conforms to said shape.

12. A flexible volumetric structure, comprising:
a first spring defining a three-dimensional volume, said first spring including at least two spaced-apart serpentine structures traversing a length of said three-dimensional volume, each of said serpentine structures being elongatable and compressible along said length, said first spring further defining opposing outboard edge regions spanning said length, said outboard edge regions being elongatable in an elongation direction aligned with said length and flexible in a plurality of directions not aligned with said elongation direction; and
a flexible skin coupled to at least one of said outboard edge regions, said flexible skin including a second spring encapsulated within a flexible solid structure, said second spring comprising a sheet-like structure capable of elongation and compression along an in-plane dimension thereof, said flexible skin oriented such that said in-plane dimension is aligned with said elongation direction, wherein the first spring and the second spring are each configured to return to an unloaded geometry after transitioning from an unloaded state to a loaded state, and wherein the at least two serpentine structures are each defined by a series of beams maintained in a spaced apart relation by a series of beam connectors aligned in two spaced apart columns along said length consisting of only one beam connector of the series of beam connectors between any two adjacent beams of the series of beams.

13. The flexible volumetric structure as in claim 12, wherein said first spring comprises one-piece construction.

14. The flexible volumetric structure as in claim 12, wherein said second spring comprises one-piece construction.

15. The flexible volumetric structure as in claim 12, wherein said first spring comprises a material selected from the group consisting of metals and plastics.

16. The flexible volumetric structure as in claim 12, wherein said second spring comprises a material selected from the group consisting of metals and plastics.

17. The flexible volumetric structure as in claim 12, further comprising a rigid structure extending at least partially into said first spring.

18. The flexible volumetric structure as in claim 17, wherein said rigid structure is hollow.

19. The flexible volumetric structure as in claim 12, further comprising a rigid structure extending through said first spring.

20. The flexible volumetric structure as in claim 19, wherein said rigid structure is hollow.

21. The flexible volumetric structure as in claim 12, wherein said at least one of said outboard edge regions is planar when said first spring is in the unloaded state.

22. The flexible volumetric structure as in claim 12, wherein said at least one of said outboard edge regions defines a three-dimensional shape when said first spring is in the unloaded state wherein said flexible skin conforms to said shape.

23. A flexible volumetric structure, comprising:
- a first one-piece spring defining a three-dimensional volume, said first one-piece spring including at least two spaced-apart serpentine structures disposed in said volume and traversing a length thereof, each of said serpentine structures being elongatable and compressible along said length, said first one-piece spring further defining opposing outboard edge regions spanning said length; and
- a flexible skin coupled to at least one of said outboard edge regions, said flexible skin including a second one-piece spring encapsulated within a flexible solid structure, said second one-piece spring comprising a sheet-like structure capable of (i) elongation along an in-plane dimension thereof, and (ii) flexibility out of said in-plane dimension, said flexible skin oriented such that said in-plane dimension is aligned with said length, wherein the first one-piece spring and the second one-piece spring are each configured to return to an unloaded geometry after transitioning from an unloaded state to a loaded state, and wherein the at least two serpentine structures are each defined by a series of beams maintained in a spaced apart relation by a series of beam connectors aligned in two spaced apart columns along said length consisting of only one beam connector of the series of beam connectors between any two adjacent beams of the series of beams.

24. The flexible volumetric structure as in claim 23, wherein said first one-piece spring comprises a material selected from the group consisting of metals and plastics.

25. The flexible volumetric structure as in claim 23, wherein said second one-piece spring comprises a material selected from the group consisting of metals and plastics.

26. The flexible volumetric structure as in claim 23, further comprising a rigid structure extending at least partially into said first one-piece spring.

27. The flexible volumetric structure as in claim 26, wherein said rigid structure is hollow.

28. The flexible volumetric structure as in claim 23, further comprising a rigid structure extending through said first one-piece spring.

29. The flexible volumetric structure as in claim 28, wherein said rigid structure is hollow.

30. The flexible volumetric structure as in claim 23, wherein said at least one of said outboard edge regions is planar when said first one-piece spring is in the unloaded state.

31. The flexible volumetric structure as in claim 23, wherein said at least one of said outboard edge regions defines a three-dimensional shape when said first one-piece spring is in the unloaded state wherein said flexible skin conforms to said shape.

* * * * *